Dec. 30, 1952     M. C. J. JACQUIER     2,624,033
SERIES CONNECTED CELLS WITH INDIVIDUAL RECTIFIER SHUNTS
Filed Sept. 10, 1951
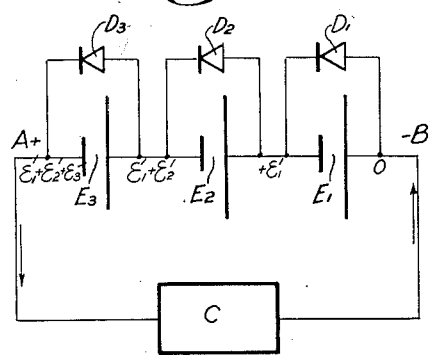
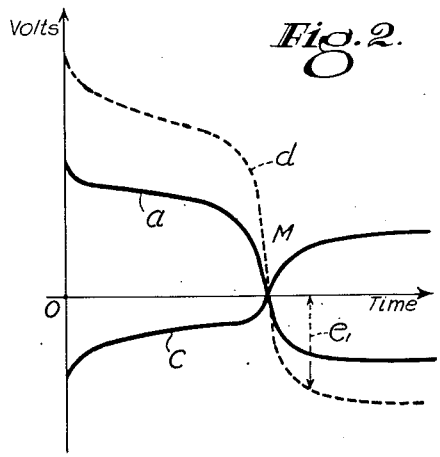
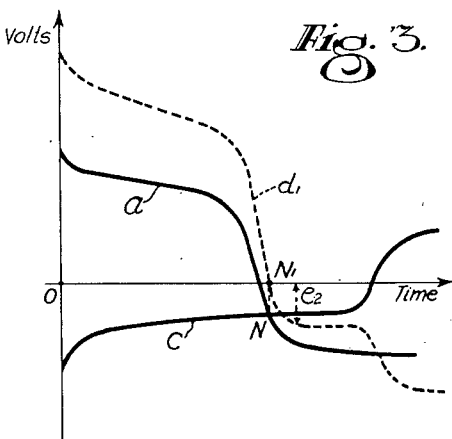
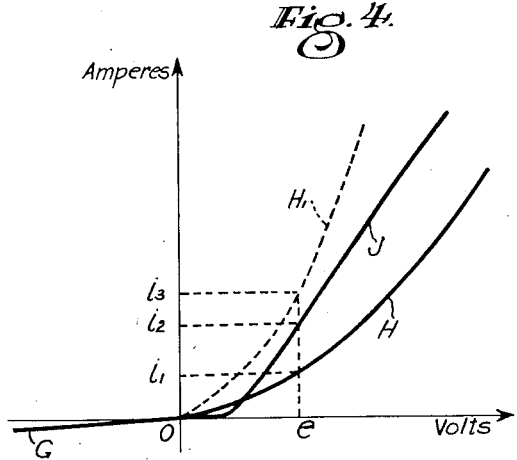
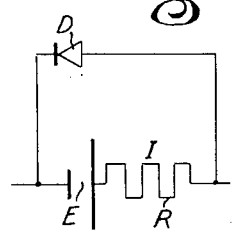
INVENTOR.
Michel C. J. Jacquier
BY Kenyon & Kenyon
ATTORNEYS Patented Dec. 30, 1952

2,624,033

UNITED STATES PATENT OFFICE 2,624,033

SERIES CONNECTED CELLS WITH INDIVIDUAL RECTIFIER SHUNTS

Michel C. J. Jacquier, Paris, France, assignor to Société des Accumulateurs Fixes & de Traction, Romainville, France, a French body corporate Application September 10, 1951, Serial No. 245,781
In France September 11, 1950

4 Claims. (Cl. 320—53)

In a battery comprising a plurality of cells mounted in series, the cells are theoretically identical to one another but very often in practice there is an appreciable difference in their capacity.

When, after having been charged, such a battery is put into service some cells are completely discharged before the others. If the battery is maintained in service, the cells which are still charged pass through the discharged cells a current which tends to recharge the latter in a direction inverse or opposite to their normal charge. It is said that there is an inverted polarity in the latter cells.

This phenomenon can cause trouble in certain batteries, in particular those of lead, zinc and the sealed batteries. It is known, for example, that in the latter, through certain artifices the gases which evolve during operation are recombined to form water. When certain cells are inverted, these artifices can no longer play their part, and the gases that evolve no longer being absorbed can cause the explosion of the inverted cells.

Such an inversion can take place, for example, when through an error the battery is being charged in a direction inverse or opposite to its normal polarity.

According to this invention, in order to avoid the inherent inconveniences of inversion of the cells, each cell is shunted by an adequate rectifier whose current-flow direction is from the negative to the positive pole of that cell. While the cell in question still has some of its capacity it polarizes the terminals of the rectifier in such a way that the latter is closed to all current flow. On the other hand, when the cell in question has exhausted its capacity the voltage at its terminals changes signs, and thus the opposite polarization is given the rectifier which then allows the passage of the total discharge current of the battery through the shunt.

A rectifier thus installed does not hinder the normal charge of the battery's cell because during this operation no current can pass through it.

When the battery is being discharged and the cell is still charged, though the flow of the current is in the direction of the rectifier's passage, no part of the current passes through this rectifier, because the polarization of its terminals due to normal current flow from the cell stops it.

Conversely, when that cell is completely discharged and eventually inverted by the passage of the discharge current, the polarization of the rectifier's terminals changes its signs and lets the current through, thus shunting the cell and avoiding its deterioration by inversion.

It is known that for a given rectifier there is a characteristic curve which indicates the current through the rectifier in relation to the voltage applied to its terminals. The rectifier is preferably so chosen that the total current passing through the battery can pass through it when the voltage applied at its terminals is precisely the voltage acquired by the cell after inversion.

A resistance may also be placed in series with the cell and a rectifier shunted around the cell and resistance. By proper regulation of the value of the resistance for a given rate of discharge, a cell can be put out of circuit by being shunted by the rectifier when the voltage at the terminals of the said cell has reached a predetermined value.

To apply the invention one can use any type of rectifier, for example, those called "dry" rectifiers which have the advantage of requiring no maintenance or auxiliary circuits; or, in certain cases, electronic rectifiers.

The following description with reference to the attached drawing, is of one illustrative embodiment of the invention, Figure 1 illustrates a battery composed of a series of cells discharging through an external circuit, in which each cell is equipped with a shunted rectifier according to the invention;

Figures 2, 3 and 4 are graphs for explaining the invention;

Figure 5 is the diagram of a cell and resistance mounted in series and shunted by a rectifier.

The battery shown in Figure 1, comprises three cells $E_1$, $E_2$ and $E_3$ each one being shunted by a rectifier, respectively $D_1$, $D_2$ and $D_3$, directed in such a manner that it allows the passage of the current from the negative pole to the positive pole of the cell. The battery discharges through an external circuit C and according to the usual conventions the current goes from the pole + to the pole — of the series, that is to say it flows in the direction of the arrows.

Let us suppose that all the cells are charged and that point B is at zero potential, the portion of the circuit between $E_1$ and $E_2$ is at the $+E_1'$ potential, the portion of the circuit between $E_2$ and $E_3$ is at $E_1'+E_2'$, and point A is at $E_1'+E_2'+E_3'$. $E_1'$, $E_2'$ and $E_3'$ are respectively the voltages in closed circuit of the cells $E_1$, $E_2$ and $E_3$. These voltages are positive because it is supposed that the series is charged.

As long as each cell has a certain capacity, it is evident that no current will flow through any of the rectifiers while the plurality is discharging in the external resistance or other load C.

Let us suppose that at given moment one of the cells, for example $E_1$ is completely discharged, the current delivered by the other cells flows through $E_1$ and inverts the voltage at the terminals of the rectifier which can then let the current through. If this rectifier is adequate and can support the totality of the discharge current of the plurality no more current can flow through $E_1$ whose inversion is then stopped.

One can better understand this phenomenon by looking at diagrams 2 and 3 which represent the potential variations of the electrodes during the discharge of the cell.

Figure 2 illustrates a cell where the anode and the cathode are of exactly the same capacity. Figure 3 illustrates a cell where the cathodic capacity is greater than the anodic, which is normal in an alkaline cell.

If we say that the hydrogen potential is zero, the curves in full line $a$ and $c$ represent respectively the potentials of the anode and of the cathode in Figures 2 and 3.

When the anode and the cathode are of the same capacity, the curves $a$ and $c$ cut the axis of abscissa (zero potential) at the same point M. At point M the discharge is over. If the current still flows through the cell the latter is inverted. The continuing of the lines $a$ and $c$ beyond M shows this inversion. The potential difference between the terminals of the cell is shown by the dotted curve $d$. This curve is above the axis of the abscissa left of point M and it is below the axis of the abscissa right of point M.

When the cathodic capacity is greater than the anodic capacity the two curves $a$ and $c$ cross at a point N when the voltage across the terminals of the cell is zero. This voltage across the terminals is represented by the curve $d_1$ (Fig. 3). This curve $d$ is above the abscissa axis left of point $N_1$, the below right of $N_1$.

When the cell is discharged, if the current of the battery is flowing through it a back electromotive force $e_1$ or $e_2$ appears rapidly.

Figure 4 represents the current through the rectifier in relation to the voltage applied at its terminals.

We know that for a negative voltage the back current represented by the curve G is practically non-existent. For the "dry" rectifiers the current in relation to the applied positive voltage is represented by curves $H_1$ or $H$. For a diodic rectifier we have the curve J which is rectilinear.

According to the nature of the rectifier for a voltage $e$ each of these rectifiers passes a current $i_1$, $i_2$ or $i_3$.

When a cell is inverted, a potential is created between its terminals. In order that the rectifier shall short circuit this cell completely, the current $i$ (Fig. 4) corresponding to $e$ must be equal to or greater than the current discharged by the battery. As Fig. 4 indicates, for every value $e$ it is advantageous to have a maximum current $i$ (so rectifier $H_1$ is of greater capacity than rectifier H). This occurs when the internal resistance of the rectifier is as low as possible.

Figure 5 shows that it is possible to put in series a resistance R with each cell E and to shunt this whole by a rectifier D.

I is the current intensity flowing through the battery, R the resistance and E the variable voltage of the cell. During the discharge the potential difference between the terminals of the rectifier is $E-RI$. Knowing I, the value of R can be determined so that the potential difference applied to the rectifier D will have the necessary value to short circuit the cell E, when the electromotive force E reaches a predetermined value. Thus the operation of the rectifier can be started before the polarity inversion of the cell E.

It is to be understood that the invention is not limited to the foregoing embodiments and may, for example, be considered as applicable to any battery arrangement in which one cell tends to invert another cell.

What I claim is:

1. A battery comprising a plurality of cells connected in series with a rectifier shunting each cell, each rectifier being so connected that its direction of current passage is from the negative to the positive terminal of the corresponding cell.

2. A battery as in claim 1 in which each rectifier is of such size as to permit the passage of the total discharge current of the battery when polarized at a potential opposite to that normally imposed on it by the cell.

3. A battery as in claim 1 in which each rectifier is directly connected to the terminals of its corresponding cell and passes the total discharge current of the battery when the inversion voltage of the said corresponding cell attains a predetermined value.

4. A battery as in claim 1 in which resistance is connected in series with a cell and the rectifier shunts the cell and resistance.

MICHEL C. J. JACQUIER.

REFERENCES CITED

The following references are of record in the file of this patent:

UNITED STATES PATENTS

| Number | Name | Date |
| --- | --- | --- |
| 2,085,598 | Oppenheim | June 29, 1937 |